INVENTOR.
Harry A. Werfel,
BY George D. Richards,
ATTORNEY.

Aug. 8, 1944.   H. A. WERFEL   2,355,576
WORK FEEDING AND SPOT SPACING CONTROL
FOR ELECTRIC SPOT WELDING MACHINES
Filed May 25, 1943   3 Sheets-Sheet 2

INVENTOR.
Harry A. Werfel,
BY George D. Richards,
ATTORNEY.

Patented Aug. 8, 1944

2,355,576

UNITED STATES PATENT OFFICE 2,355,576

WORK FEEDING AND SPOT SPACING CONTROL FOR ELECTRIC SPOT WELDING MACHINES

Harry A. Werfel, Essex Fells, N. J.

Application May 25, 1943, Serial No. 488,330

6 Claims. (Cl. 219—4)

This invention relates to improvements in electric spot welding machines; and the invention has reference, more particularly, to novel work feeding and spot weld spacing control means for such machines.

The invention has for an object to provide a novel means for progressively feeding the work to be welded in contact with the welding electrodes of a spot welding machine, while at the same time so controlling delivery of electrical energy to said electrodes as to progressively produce in the work a succession of spaced spot welds, either in a desired spaced apart linear relation, or in such contiguous or lapped relation as to produce in the work a continuous weld or linearly uninterrupted welded joint or seam.

The invention has for another object to provide, in an electric spot welding machine, a movable work feeding carriage, a rotatable feed screw for moving said carriage so as to advance the work, engaged or carried thereby, relative to the welding electrodes of the machine, while in contact with the latter, and an electrical circuit make and break switch means adapted to be actuated by the rotation of said feed screw, whereby to so control delivery of current to the welding electrodes, while the work is progressively advanced in contact therewith, as to intermittently energize said electrodes and thus produce a succession of spot welds in the work.

Other objects of this invention, not at this time more particularly enumerated, will be understood from the following detailed description of the same.

An illustrative embodiment of the invention is shown in the accompanying drawings, in which:

Fig. 1 is a fragmentary side elevational view of an electric spot welding machine having cooperative electrode supporting arms or horns, and as equipped with the novel work feeding and spot weld spacing control means according to this invention, the work operated on being shown in this view in dotted outline; Fig. 2 is a top plan view of the same, with the work operated on being shown by full lines; Fig. 3 is a fragmentary cross-sectional view, taken on line 3—3 in Fig. 2, the work operated on also being shown in this view by full lines; and Fig. 4 is another fragmentary cross-sectional view, taken on line 4—4 in Fig. 2.

Similar characters of reference are employed in the hereinabove described views, to indicate corresponding parts.

Figure 6:
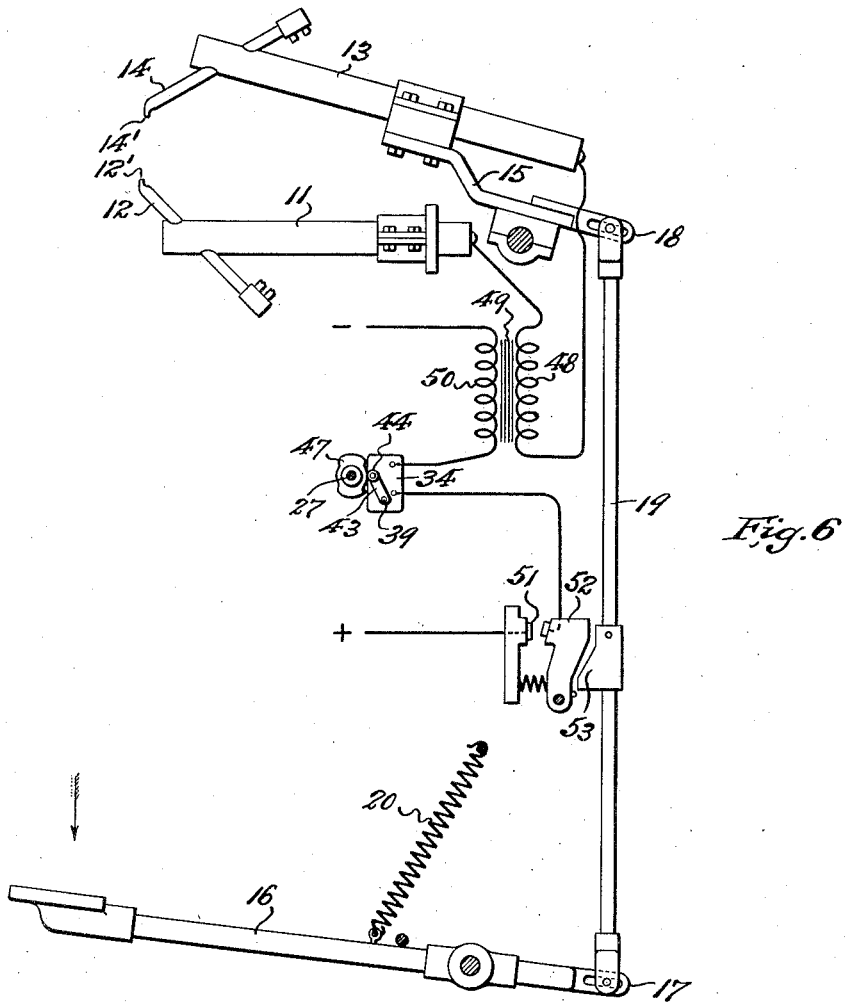
Fig. 6 is a schematic view of means for actuating a movable electrode supporting arm or horn, including a circuit diagram of the electrical system and agencies for energizing the machine electrodes.

In the drawings, the reference character 10 indicates an electric spot welding machine equipped with a lower and normally stationary arm or horn 11 adapted to mechanically and electrically mount one welding electrode 12, and an upper movable arm or horn 13 adapted to mechanically and electrically mount the other welding electrode 14. Said movable arm or horn 13, as shown in Fig. 6 more particularly, is affixed to a pivoted bracket 15, by which it is normally positioned in an up-swung normal initial or out of service position, but capable of being down-swung to in-service position, whereby to engage the work to be welded by and between its welding electrode 14 and the welding electrode 12 of the stationary arm or horn 11. Suitable means is provided for lowering and raising the movable arm or horn 13 and its welding electrode 14; and one illustrative form of means for so actuating said movable arm or horn, as shown in Fig. 6, comprises a pivoted foot treadle lever 16, the tail 17 of which is connected to the tail 18 of said bracket 15 by a push-bar 19. Suitably arranged spring means 20 is provided for normally and yieldably holding the foot treadle lever 16 in upswing position, and correspondingly also yieldably holding the arm or horn 13 and its welding electrode 14 in normal initial up-swung out of service position.

The work feeding and spot weld spacing control means according to this invention, in an illustrative form thereof as shown, comprises a supporting frame-work 21 which is secured to the machine 10 to project outwardly therefrom parallel and adjacent to the stationary arm or horn 11, and in suitably laterally offset relation thereto. Affixed to said frame-work 21, but electrically insulated therefrom by interposed blocks 22 of electrical insulation material, is a guideway frame 23, the spaced flanges 24 of which provide trackway means for supporting and guiding a carriage means by which the work to be welded is advanced relative to the welding electrodes 12 and 14 of the machine. Mounted in bearings 25 and 26, which are suitably affixed to the guideway frame 23, is a feed screw 27. Said feed screw 27 extends parallel to and intermediate the trackway flanges 24 of said guideway frame 23. Said feed screw 27 engages a carriage block 28, the inner end portion of which extends between the trackway flanges 24 of the guideway frame 23, so as to be slidably guided thereby. Affixed to the outer extremity of said feed screw 27 is a crank-handle 29, by which the same may be manually rotated.

Figure 2:
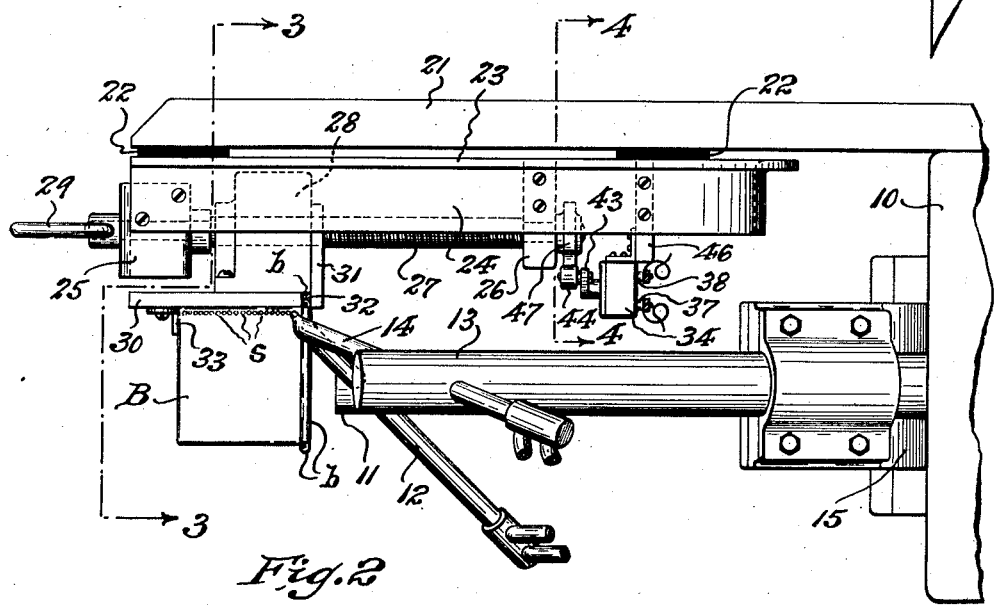

The carriage block 28 may be equipped with means suitable to engage a particular kind of work desired to be welded, and in detail structure is therefore subject to modification whereby to accommodate its work engaging function to the selected kind and shape of work to be operated upon. For purposes of illustration, the work engaging means with which the carriage block 28 is provided, as shown, is arranged to engage work comprising a hollow rectangular box body B, the mouth periphery of which is provided with external peripheral curled edges or peripheral bead portions b. One wall of the box body B is provided with a joint flange f to which an adjoining wall w is to be welded, whereby to join said walls into the box body formation. To provide means for mounting such illustrative form of work on the carriage means, the carriage block 28 is faced, at the side thereof toward the welding electrodes 12 and 14, with a carriage panel 30, and at its inner end with an end panel 31 which laps but is spaced from the adjacent inner edge of said carriage panel 30, whereby to provide a receiving channel 32 to receive a curled edge or peripheral bead portion b of the box body B (see Fig. 2). Said carriage panel 30 is preferably made of a material which is a poor conductor of heat, such e. g. as an asbestos composition material or the like. Affixed to the external face of the carriage panel 30 is a stop member 33 adapted to abut the bottom wall of the box body B, as shown. It will be obvious that, when the box body B is abutted against the external face of the carriage panel 30, which a curled edge or peripheral bead portion b lodged in and embraced by the channel 32, and the box bottom butted against the stop member 33, movement of the carriage means in either direction will be imparted to the box body, so that the same may be moved relative to the welding electrodes 12 and 14 of the machine when the latter are operatively engaged with the box body in the manner hereinafter set forth.

Figure 1:
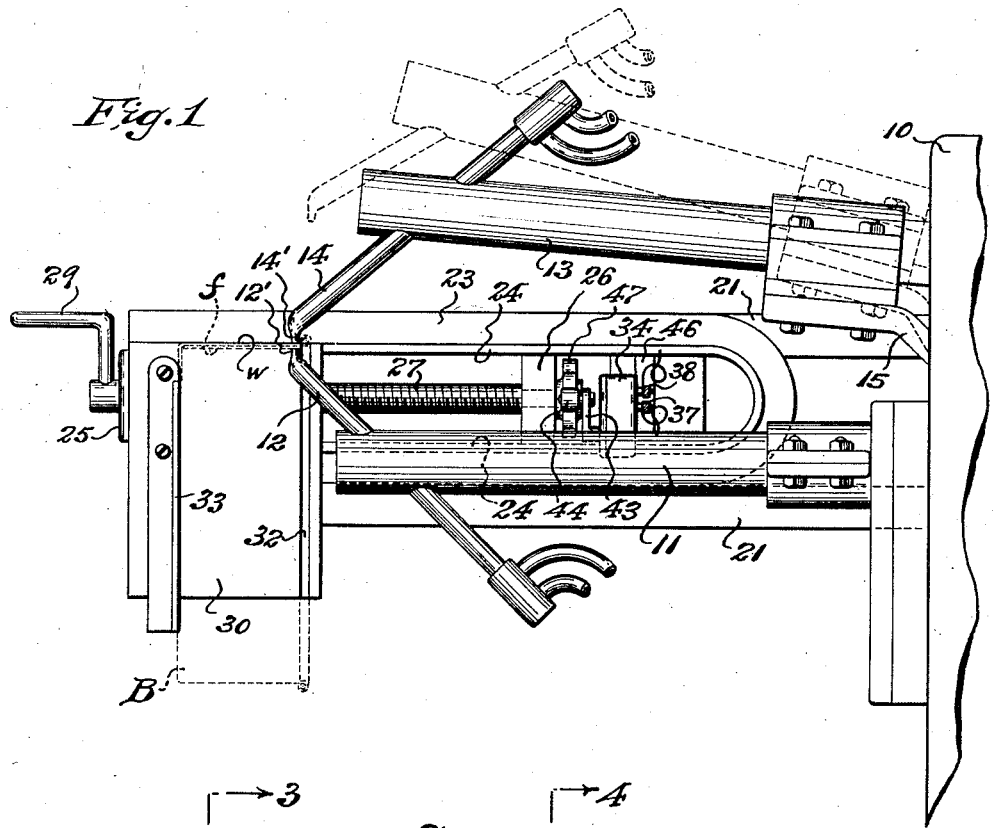
Figure 3:
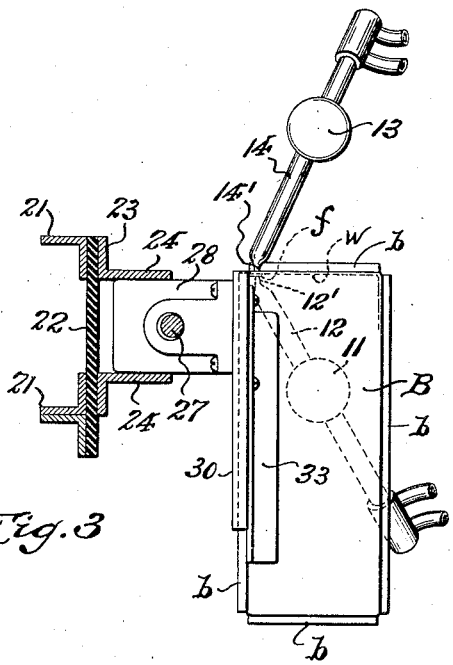
Figure 4:
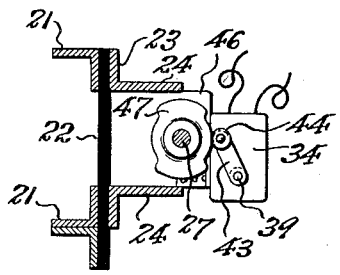

The welding electrodes 12 and 14 are so supported by their respective arms or horns as to be angularly directed therethrough, whereby to sufficiently offset the respective operative tips 12' and 14' of said electrodes as to permit proper engagement of the carriage supported work thereby; e. g. with the electrode 12 reaching into the interior of the box body B to engage the joint flange f by its tip 12', and with the electrode 14 engaging the exterior of the box wall w by its tip 14' in aligned opposition to said electrode tip 12' (see Figs. 1 and 3).

Figure 5:
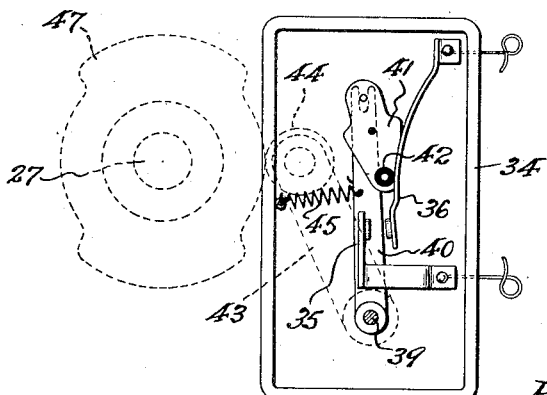
Fig. 5 is an enlarged detail view of an illustrative form of the feed screw actuated electrical circuit make and break switch means of the mechanism.

The means for controlling delivery of current to the welding electrodes 12 and 14, while the work is progressively advanced in contact therewith, whereby to intermittently energize said electrodes, and thus produce a succession of spot welds for joining the joint flange f and wall w of the box body B, comprises an electrical make and break switch means adapted to be actuated by rotation of the feed screw 27. Said switch means may vary considerably in its detail form and construction, but preferably comprises a form in which the contacts thereof are at least opened by a snap action calculated to reduce arcing to a minium. A switch of this character is conventionally and somewhat schematically shown in Fig. 5, wherein a suitable casing 34 encloses the switch mechanism. Said switch mechanism includes a stationary contact element 35 and a resilient contact element 36, respectively provided with external binding posts 37 and 38, or like circuit wire connectors, externally of the casing 34. Journaled in the casing walls is a rock-shaft 39 on which is fixed an actuating lever 40 to operatively engage a pivoted tumbler 41. Said tumbler 41 is provided with a stud 42 to engage and disengage the resilient contact element 36 with and from the stationary contact element 35, when the tumbler is oscillated by the actuating lever 40. Fixed on an external end of said rock shaft is a lever arm 43, having a roller stud 44 mounted on its free end portion. Suitably arranged spring means 45 rocks the rock-shaft 39 to swing the actuating lever 40 and lever arm 43 in switch contact breaking direction. The switch means is mounted adjacent to the inner end of the feed screw 27, and to this end its casing 34 is suitably affixed to a supporting bracket plate 46, which in turn is affixed to and projects from the guideway frame 23. Fast on the inner end of the feed screw 27 is a switch actuating and timing cam 47, the periphery of which is operatively engaged by the roller stud 44 of the switch lever arm 43. Said cam 47 is suitably shaped to oscillate the lever arm 43 and in turn the switch actuating lever 40, whereby to cause the control switch 34 to intermittently make and break the electrical circuit by which the welding electrodes are energized, in desired timed relation to the work advancing movement of the work holding carriage as effected by rotation of the feed screw 27; the rotation of which revolves said cam 47.

The arms or horns 11 and 13, and their respective welding electrodes 12 and 14, are respectively connected to opposite poles of the secondary coil 48 of a transformer 49. The primary coil 50 of said transformer is connected in a power circuit to receive current from a suitable source of electrical energy, and the control switch 34 is connected in said power circuit in series with the primary coil 50 of the transformer. As is usually the case, the spot welding machine is provided with a power cut-out switch means in series with the primary coil 50 of the transformer, and in this case also in series with the control switch 34. Said power cut-out switch in an ordinary form thereof, applicable to a foot treadle controlled spot welding machine, comprises a stationary contact means 51 and a cooperating spring released movable contact means 52 located adjacent to the foot treadle lever actuated push-bar 19. Fixed on said push-bar 19 is a cam-block 53 which, on upward movement of said push-bar 19, to effect downward swing of the movable arm or horn 13 and its welding electrode 14 to operative in-service position, is caused to engage the movable contact means 52, and move the same into power circuit closing engagement with the stationary contact means 51 of the power cut-out switch. By this arrangement said power switch remains closed throughout the time the movable cam or horn 13 and its welding electrode 14 remains down-swung to operative in-service position cooperative with the stationary arm or horn 11 and its welding electrode 12; during which time the power circuit is controlled by the control switch 34. When the foot-treadle lever and push-bar 19 is released to permit upswing of the arm or horn 13 to normal initial out of service position, the movable contact element 52 of the power switch is released and the latter opens to cut out delivery of energy to the transformer 49. The described circuit arrangements are to be understood as illustrative, since variations or modifications thereof are possible within the scope of this invention as hereinafter claimed.

In operation, the work, in the illustrative case shown and described being the box body B, is engaged with the work advancing carriage means in such manner as to permit the electrode 12 of the stationary arm or horn to enter through its open side or top whereby to engage the electrode tip portion 12' with the under side of the joint flange f. Preferably the feed screw is rotated anti-clockwise, to move the carriage and box body inwardly until the electrode tip portion 12' is stopped at an interior corner of the box body; this being done while the movable arm or horn 13 remains raised to out-of-service position, thus disposing the work so that the welding may start at said interior corner of the box body.

The work having been positioned ready to begin the welding operation, the foot treadle lever 16 is pushed down by the operator, thereby moving upwardly the push-bar 19 to swing down the movable arm or horn 13 and its electrode 14 to engage the work in opposition to the electrode 12 of the stationary arm or horn 11. As the movable arm or horn is thus swung down to operative position, the cam-block 53 operates and closes the power switch 51—52 so that current is delivered to the primary of the transformer, thus energizing the transformer secondary for delivery of energizing current to the welding electrodes. The operator thereupon rotates the feed screw 27 in clockwise direction, thus moving the carriage and box body outwardly while operatively engaged by the electrode tip portions 12' and 14'. As the feed screw 27 is thus rotated to move the carriage and work, it simultaneously revolves the control switch actuating cam 47, whereby the electrical energy delivered to the welding electrodes is intermittently interrupted, with the consequence that a linear succession of spot welds s is produced in uniformly spaced relation (see Fig. 2), thus forming a spot welded seam or joint between the joint flange f and contiguous box wall w; after which the arm or horn 13 is raised to inactive out-of-service position, and the work is removed.

It will be obvious, that the spacing of the spot welds, in the linear succession thereof thus produced, may be desirably predetermined either by varying the pitch of the feed screw 27, and thus the speed of movement of the work, relative to a given shape of control switch actuating cam 47; or by varying the shape of said control switch actuating cam relative to a given pitch of feed screw; or by varying both feed screw pitch and cam shape. It is therefore possible to provide an arrangement which, in operation, will produce a succession of definitely spaced spot welds at a desired selected interval of separation, or to so space the spot welds that the same are contiguous one to the other or even overlapped one upon another, when it is desired to produce an uninterrupted or continuous welded joint or seam.

It will be understood that the work feeding and spot weld spacing control of this invention may be applied to various designs and types of spot welding machines other than that shown and above described for purposes of illustration.

It will also be understood that various changes may be made in the disclosed construction of the work feeding and spot weld spacing control means per se, and many apparently widely different embodiments thereof could be made without departing from the scope of this invention as defined by the following claims. It is therefore intended that all matter contained in the above description or shown in the accompanying drawings shall be interpreted as illustrative and not in a limiting sense.

I claim:

1. In a spot welding machine having cooperative welding electrodes, an electrically insulated movable work holding means for moving the work to be welded while operatively engaged by said electrodes, a rotatable feed screw for continuously advancing said work holding means and the work carried thereby, an electrical circuit make and break switch means for controlling delivery of energizing current to said electrodes while operatively engaged with the moving work, said switch means having an oscillatable actuating lever means, and a cam actuated by rotation of said feed screw for oscillating said switch means actuating lever all whereby selected pitch of the feed screw and/or selected shape of the cam determines relative spacing of the succession of produced spot welds.

2. In a spot welding machine having cooperative welding electrodes, one at least of which is movable relative to the other and toward and from work engaging position, a fixed guideway adjacent to the work engaging position of said electrodes, work holding means movable in and guided by said guideway for moving the work to be welded while operatively engaged by said electrodes, a rotatable feed screw for moving said work holding means, an electrical circuit make and break switch means for controlling delivery of circuit to said electrodes to intermittently energize the same while they are operatively engaged with the moving work, and means actuated by rotation of said feed screw for operating said switch means.

3. In a spot welding machine having cooperative welding electrodes, one at least of which is movable relative to the other and toward and from work engaging position, a fixed guideway adjacent to the work engaging position of said electrodes, work holding means movable in and guided by said guideway for moving the work to be welded while operatively engaged by said electrodes, a rotatable feed screw for moving said work holding means, an electrical circuit make and break switch means for controlling delivery of circuit to said eelctrodes to intermittently energize the same while they are operatively engaged with the moving work, said switch means having an oscillatable actuating lever means, and a cam actuated by rotation of said feed screw for oscillating said switch means actuating lever.

4. In a spot welding machine having cooperative welding electrodes, one at least of which is movable relative to the other and toward and from work engaging position, guided work carrying means, movable feeding means for moving the work carrying means so as to progressively advance the work to be welded while it is operatively engaged by said electrodes, an electrical make and break switch means for controlling delivery of current to said electrodes to intermittently energize the same while they are operatively engaged with the moving work, and means actuated by said feeding means for operating said make and break switch means.

5. In a spot welding machine having cooperative welding electrodes, one at least of which is movable relative to the other and toward and from the work engaging position of said electrodes, a fixed guideway adjacent to the work engaging position of said electrodes, work holding means movable in and guided by said guideway for moving the work to be welded while operatively engaged by said electrodes, a rotatable feed screw for moving said work holding means, an electrical circuit make and break switch means for controlling delivery of current to said electrodes to intermittently energize the same while they are operatively engaged with the moving work, means actuated by rotation of said feed screw for operating said make and break switch means, a transformer to the secondary of which said electrodes are connected, a circuit for supplying power to the primary of said transformer, a power circuit switch means, said make and break switch means being connected in said power circuit in series with said power circuit switch means, operable means for bringing said electrodes into work engaging position, and means operated by the last mentioned means for controlling said power circuit switch means.

6. In a spot welding machine having cooperative welding electrodes, one at least of which is movable relative to the other and toward and from the work engaging position of said electrodes, a fixed guideway adjacent to the work engaging position of said electrodes, work holding means movable in and guided by said guideway for moving the work to be welded while operatively engaged by said electrodes, a rotatable feed screw for moving said work holding means, an electrical circuit make and break switch means for controlling delivery of current to said electrodes to intermittently energize the same while they are operatively engaged with the moving work, said make and break switch means having an oscillatable actuating lever means, a cam actuated by rotation of said feed screw for oscillating said lever means, a tranformer to the secondary of which said electrodes are connected, a circuit for supplying power to the primary of said transformer, a power circuit switch means, said make and break switch means being connected in said power circuit in series with said power circuit switch means, operable means for bringing said electrodes into work engaging position, and means operated by the last mentioned means for controlling said power circuit switch means.

HARRY A. WERFEL.